No. 745,963. PATENTED DEC. 1, 1903.
J. KOSLOPSKY.
SINK AND SINK STRAINER.
APPLICATION FILED JUNE 17, 1903.
NO MODEL. 2 SHEETS—SHEET 1.
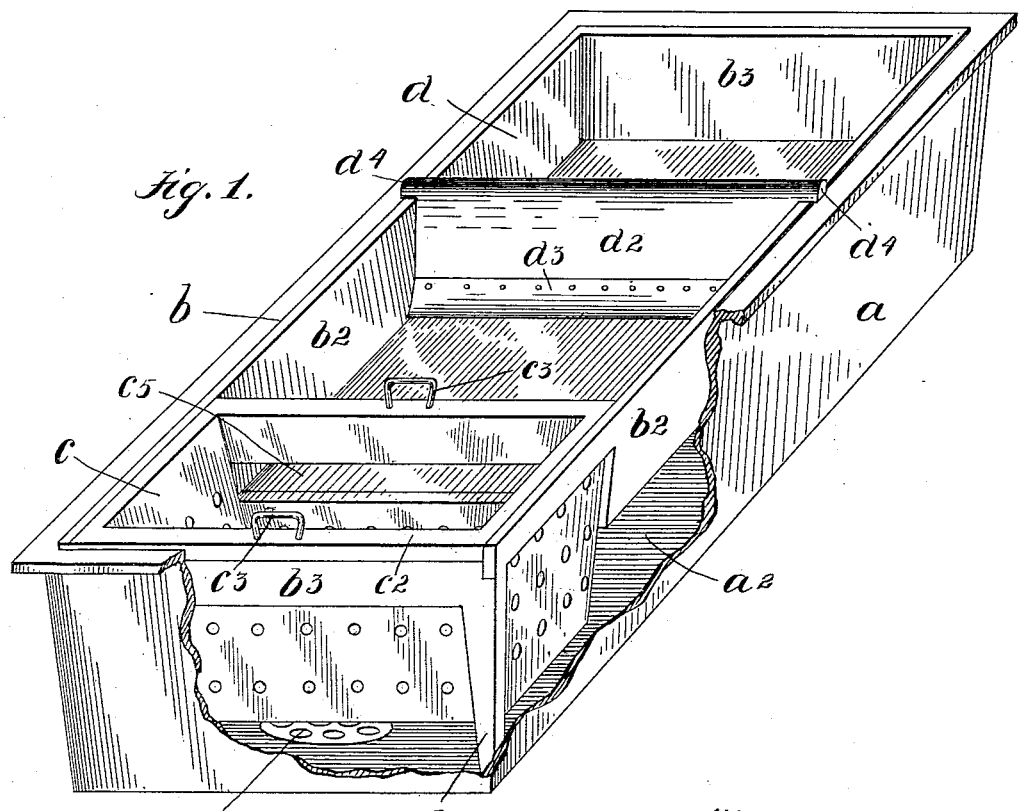
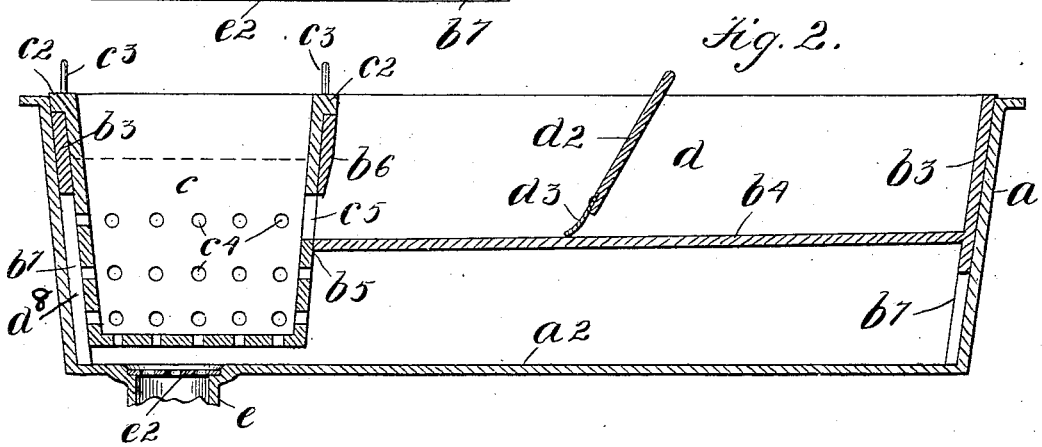
WITNESSES
F. A. Stewart
C. E. Mulreany
INVENTOR
Julius Koslopsky
BY Edgar Tate & Co
ATTORNEYS No. 745,963. PATENTED DEC. 1, 1903.
J. KOSLOPSKY.
SINK AND SINK STRAINER.
APPLICATION FILED JUNE 17, 1903.
NO MODEL. 2 SHEETS—SHEET 2.
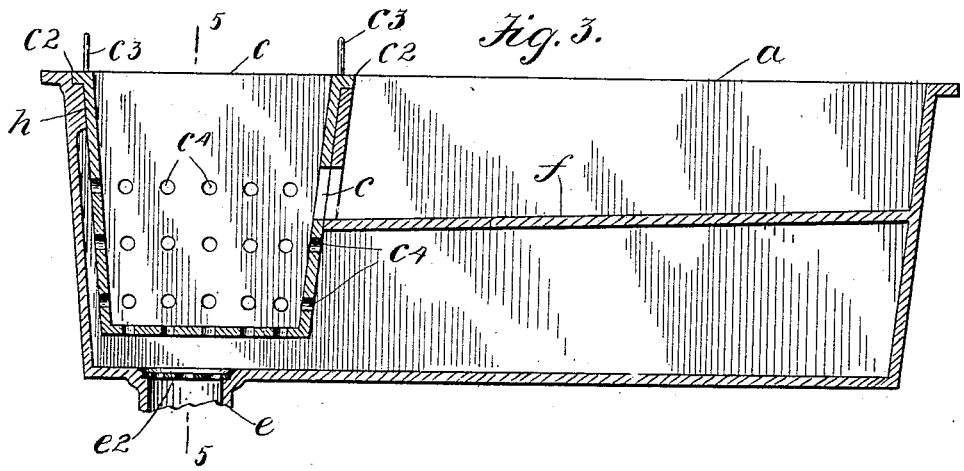
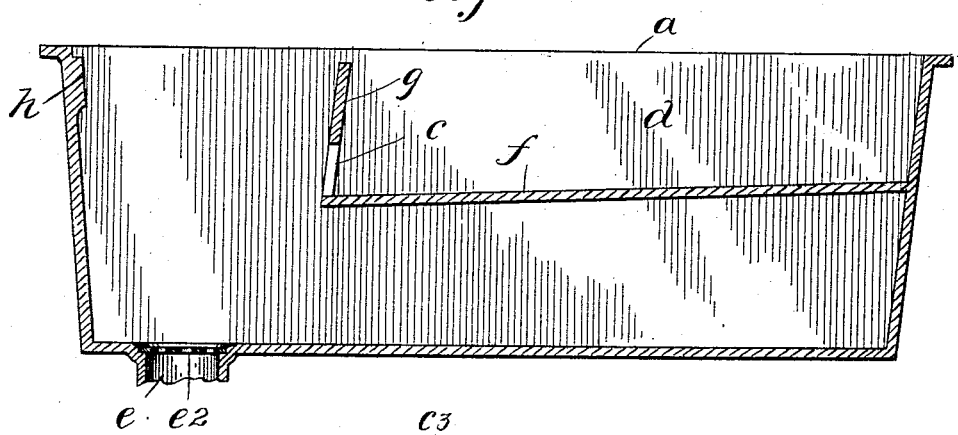
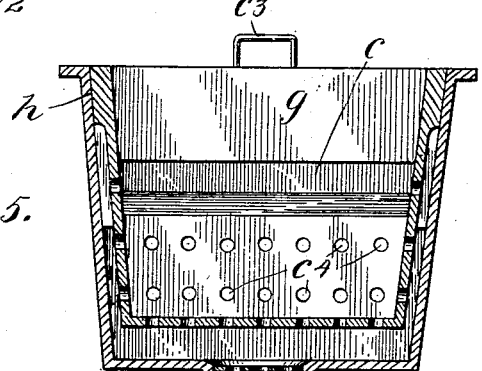
WITNESSES
INVENTOR
Julius Koslopsky
BY
Edgar Tate & Co
ATTORNEYS No. 745,963. Patented December 1, 1903.

UNITED STATES PATENT OFFICE.

JULIUS KOSLOPSKY, OF NEW YORK, N. Y.

SINK AND SINK-STRAINER.

SPECIFICATION forming part of Letters Patent No. 745,963, dated December 1, 1903.

Application filed June 17, 1903. Serial No. 161,762. (No model.)

*To all whom it may concern:*

Be it known that I, JULIUS KOSLOPSKY, a citizen of the United States, residing at New York, borough of Manhattan, in the county of New York and State of New York, have invented certain new and useful Improvements in Sinks and Sink-Strainers, of which the following is a specification, such as will enable those skilled in the art to which it appertains to make and use the same.

The object of this invention is to provide an improved sink and sink-strainer whereby the danger of the drain pipe or pipes leading from the strainer becoming clogged is entirely obviated and whereby the sink may be kept clean at all times; and with this and other objects in view the invention consists in the construction, combination, and arrangement of parts, as hereinafter described and claimed.

The invention is fully disclosed in the following specification, of which the accompanying drawings form a part, in which the separate parts of my improvement are designated by suitable reference characters in each of the views, and in which—

Figure 1 is a perspective view of a sink and sink-strainer made according to my invention, part of the construction being broken away; Fig. 2, a longitudinal vertical section thereof; Fig. 3, a view similar to Fig. 2, but showing a modification; Fig. 4, a view similar to Fig. 3, showing the sink alone with the strainer removed; and Fig. 5, a vertical section on the line 5 5 of Fig. 3.

Referring to Figs. 1 and 2 of the drawings, I have shown an ordinary sink $a$, which is oblong and rectangular in form and in which is placed a frame $b$, comprising side members $b^2$, end members $b^3$, and a bottom portion $b^4$, which is about two-thirds the length of the sink and terminates at $b^5$ and over the end of which at $b^5$ is placed a transverse bar or support $b^6$, and the frame $b$ is provided with corner legs or supports $b^7$, whereby the bottom portion $b^4$ thereof is supported a predetermined distance above the bottom $a^2$ of the sink. The end portion $b^3$ of the frame $b$ at the discharge end of the sink and the transverse bar or support $b^6$ are preferably slightly below the top of the sink, and I also provide a removable box or receptacle $c$, which fits in the end portion of the frame $b$, at the end $b^5$ of the bottom $b^4$ thereof, and which is provided with side flanges $c^2$, which rest on the end piece $b^3$ of the frame $b$ and on the transverse bar or support $b^6$, and the box or receptacle $c$ is provided with handles $c^3$, by which it may be manipulated or taken from the sink or placed in position therein whenever desired. The box or receptacle $c$ is also rectangular in form, and the bottom thereof extends nearly to the bottom of the sink, and the side and end walls thereof are tapered inwardly, whereby a space $d^8$ is formed between one side and both ends thereof and the corresponding walls of the sink, and both the sides and ends of said box or receptacle are perforated, as shown at $c^4$, to form a strainer. The inner side of the box or receptacle $c$ is provided over the bottom portion $b^4$ of the frame $b$ with a transverse opening $c^5$, and by reason of the construction herein described a main receptacle $d^8$ is formed over the bottom portion $b^4$ of the frame $b$, into which the water and other substances to be strained and discharged from the sink are first placed, and placed in this main receptacle $d$ is a scraper $d^2$, comprising a transverse plate having a flexible bottom member $d^3$, of rubber or any other suitable material, and the top of which is provided with projecting fingers $d^4$, which rest on the top of the frame $b$ and sink $a$. The bottom of the sink $a$ is also provided at one end with a drain-pipe $e$, having a removable strainer $e^2$, and this drain-pipe may be placed under the box or receptacle $c$, as shown in the drawings, or it may be placed at the opposite end of the sink or at any desired point in the bottom $a^2$ thereof. In using this sink and strainer the water and other substances are placed or poured or dumped into the receptacle $d$, and the water, with material which it is desired to keep from passing into the drain-pipe $e$, flows through the opening $c^5$ into the box or receptacle $c$, and the water flows through the perforations $c^4$, which operate as a strainer, into the bottom portion of the sink, while the refuse or such substances as it is desired should not pass into the drain-pipe $e$ are retained in the box or receptacle $c$, and said box or receptacle may be removed and emptied and cleaned whenever necessary. The scraper $d^2$ is used for the purpose of scraping material from the bottom $e^4$ of the receptacle $d$ into the box or receptacle c; but this scraper does not form an essential feature of my invention and may or may not employed.

In the construction shown in Figs. 3 to 5, inclusive, the sink a is provided about midway thereof with a horizontal partition-plate f and with an upright partition-plate g at the end thereof, and these parts form the receptacle d, and the partition-plate g takes the place of the bar or support $b^6$, (shown in Fig. 2,) while the adjacent end of the sink a is provided with a bearing h, and the flanges $c^2$ of the box or receptacle c rest on the transverse partition-plate g and the bearing or support h.

In the form of construction shown in Figs. 1 and 2 the entire frame b is removable, together with the box or receptacle c; but in the construction shown in Figs. 3 to 5, inclusive, only the box or receptacle c is removable; but the operation will be the same in all respects as with the construction shown in Figs. 1 and 2. With both forms of construction it will be seen that a supplemental receptacle $d^8$ is formed in one end of the sink and discharges into the removable strainer, consisting of the box or receptacle c, which extends below the bottom of the supplemental receptacle, and these constitute the chief feature of my invention.

Having fully described my invention, what I claim as new, and desire to secure by Letters Patent, is—

1. In a device of the class described, a sink having a horizontal partition-plate which extends a portion of its length, and a removable strainer-box placed in the sink at the end of said partition-plate and provided in the side thereof adjacent to said partition-plate with an opening, the bottom of the sink being also provided with a drain-pipe, substantially as shown and described.

2. In a device of the class described, a sink which is oblong in form and provided at one end with a horizontal partition-plate which extends the greater part of the length thereof, a removable strainer-box supported in said sink at the end of the partition-plate and the side of which is provided over the partition-plate with an opening, the partition and the strainer-box forming a receptacle over said partition-plate, substantially as shown and described.

3. In a device of the class described, an oblong sink the bottom of which is provided with a drain-pipe, a removable frame placed in said sink and provided with a horizontal bottom portion of less length than the sink, a removable strainer-box placed in said frame at the end of the bottom portion of said frame and extending below said bottom portion, and the side of which adjacent to said bottom portion of the removable frame is provided with a transverse opening, the said frame and the removable strainer-box forming a receptacle over the bottom portion of the frame, substantially as shown and described.

4. In a device of the class described, an oblong sink the bottom of which is provided with a drain-pipe, a removable frame placed in said sink and provided with a horizontal bottom portion of less length than the sink, a removable strainer-box placed in said frame at the end of the bottom portion of said frame and extending below said bottom portion and the side of which adjacent to said bottom portion of the removable frame is provided with a transverse opening, the said frame and the removable strainer-box forming a receptacle over the bottom portion of the frame and handles formed upon said strainer-box, substantially as shown and described.

5. In a device of the class described a sink provided in one end with a supplemental receptacle adjacent to one end of which is placed a removable strainer the bottom of which extends below the bottom of the supplemental receptacle, said supplemental receptacle and strainer being in communication, substantially as shown and described.

In testimony that I claim the foregoing as my invention I have signed my name, in presence of the subscribing witnesses, this 13th day of June, 1903.

JULIUS KOSLOPSKY.

Witnesses:
F. A. STEWART,
C. E. MULREANY.